No. 670,193. Patented Mar. 19, 1901.
A. J. BROWN.
SAND BAND FOR VEHICLE WHEELS.
(Application filed Sept. 15, 1900.)
(No Model.)

Witnesses
Jos. H. Blackwood

Inventor
Andrew J. Brown
by S. A. Gowrich
Attorney

UNITED STATES PATENT OFFICE.

ANDREW J. BROWN, OF OKLAHOMA CITY, OKLAHOMA TERRITORY.

SAND-BAND FOR VEHICLE-WHEELS.

SPECIFICATION forming part of Letters Patent No. 670,193, dated March 19, 1901.

Application filed September 15, 1900. Serial No. 30,155. (No model.)

*To all whom it may concern:*

Be it known that I, ANDREW J. BROWN, a citizen of the United States, residing at Oklahoma City, in the county of Oklahoma and Territory of Oklahoma, have invented certain new and useful Improvements in Sand-Bands for Wagons and other Vehicles, of which the following is a specification.

My invention relates to improvements in sand-bands for wagons and other vehicles.

The invention consists in the features and combination of features as more fully hereinafter described and claimed.

My invention has for its object to prevent dirt, sand, gravel, or other matter from entering between the axle and hub and wearing or grinding away the surfaces of the box of the hub and the axle-spindle.

Figure 1:
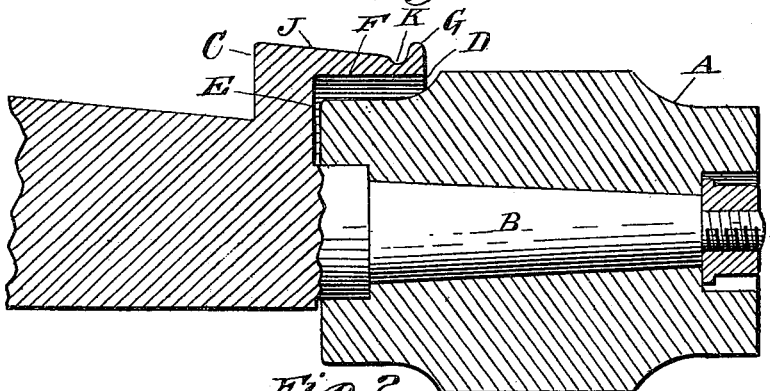
Figure 2:
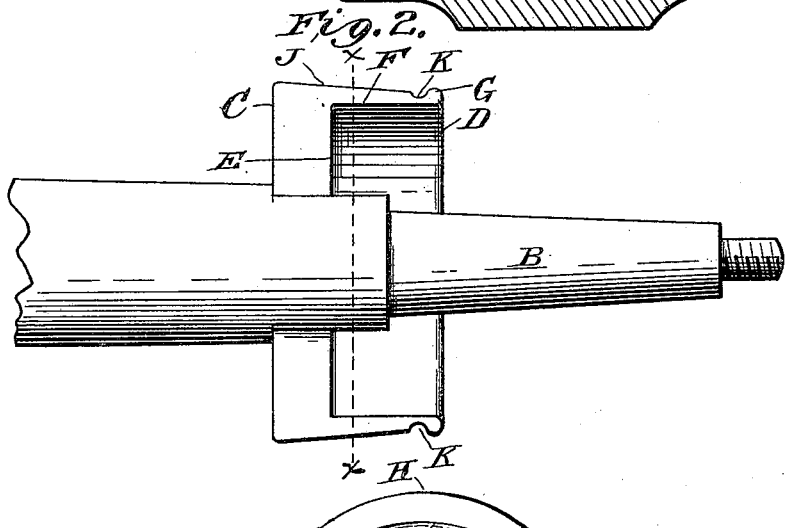
Figure 3:
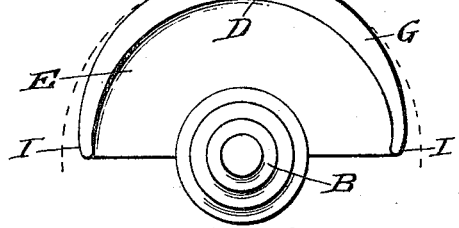
Figure 4:
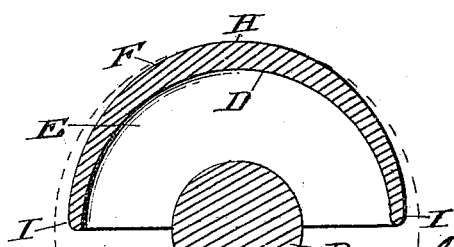

Referring to the drawings, Figure 1 is a longitudinal section of an axle-spindle and wheel-hub of a vehicle, showing my invention; Fig. 2, a bottom plan view of the axle-spindle and sand-band; Fig. 3, an end view of the same, and Fig. 4 a cross-section on line x x of Fig. 2.

In the drawings, in which like letters of reference denote like parts throughout the several views, A represents an ordinary hub of a wagon or carriage wheel, B the axle-spindle on which said wheel is mounted and revolves, C and the sand-band, adapted to cover the inner end of the hub and comprising a semicircular hood or casing D, made, preferably, integral with the axle-spindle and provided with a vertical wall or head E, having a horizontal flange F extending outwardly from said wall E and provided with a bead or rim G on its outer edge. The outer surface of said flange F curves inward from the center H to the lower edges I thereof, and also tapers downward gradually, as at J, from the rear of the wall E to the bead G, and at the point where it joins said bead a channel K is formed. The object of tapering the outer surface of the flange downwardly is to direct sand or other material that falls thereon into the channel K. The object of curving the outer surface of the flange F inwardly from the center to the lower edge thereof is to afford means for readily diverting the sand or other material from the same, and the object of the bead on the outer edge of the flange F is to prevent the sand from falling over the edge of said flange.

The hood or casing may be made in other forms than semicircular and also may be made separate from the axle-spindle instead of integral therewith, and the construction may be varied somewhat in other respects without departing from the spirit of my invention.

Having thus described my invention, what I claim is—

1. A sand-band for vehicles comprising a hood or casing adapted to extend over the hub of a wheel and provided with a bead or rim on its edge and a channel adjacent thereto, said hood or casing tapering from its rear end to said channel, substantially as shown and described.

2. A sand-band for vehicles comprising a hood or casing attached to the axle thereof and extending over the hub of the wheel, and provided with a bead or rim on its edge and a channel adjacent to said bead, said hood or casing tapering gradually from the rear end to said channel, substantially as shown and described.

3. A sand-band for vehicles comprising a hood or casing attached to the axle thereof and extending over the hub, and provided with a vertical wall at its rear, and at its front edge with a bead, and a channel adjacent thereto, said hood or casing tapering gradually from said wall to said channel, substantially as shown and described.

4. A sand-band for vehicles comprising a hood or casing which curves inward from the center to the lower edges, and is provided on its front edge with a bead and a channel adjacent thereto, substantially as shown and described.

5. A sand-band for vehicles comprising a hood or casing provided with a bead on its front edge and a channel adjacent thereto, the outer surface of said hood or casing tapering downward to said channel, and also curving inward from the center to the lower edges, substantially as shown and described.

In testimony whereof I hereto affix my signature in the presence of two witnesses.

ANDREW J. BROWN.

Witnesses:
H. B. P. WINN,
T. B. SEAWELL.

It is hereby certified that in Letters Patent No. 670,193, granted March 19, 1901, upon the application of Andrew J. Brown, of Oklahoma City, Oklahoma Territory, for an improvement in "Sand-Bands for Vehicle-Wheels," an error appears in the printed specification requiring correction, as follows: On page 1, line 31, the word "and" should be stricken out; and that the said Letters Patent should be read with this correction therein that the same may conform to the record of the case in the Patent Office.

Signed, countersigned, and sealed this 26th day of March, A. D., 1901.

[SEAL.]

F. L. CAMPBELL,
*Assistant Secretary of the Interior.*

Countersigned:
    WALTER H. CHAMBERLIN,
        *Acting Commissioner of Patents.*